L. A. CORNELIUS.
FAUCET GUARD.
APPLICATION FILED MAY 12, 1913.
1,105,258.
Patented July 28, 1914.
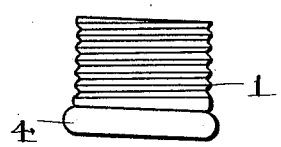
Fig. 1.
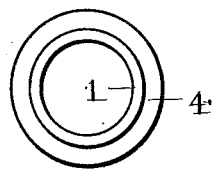
Fig. 2.
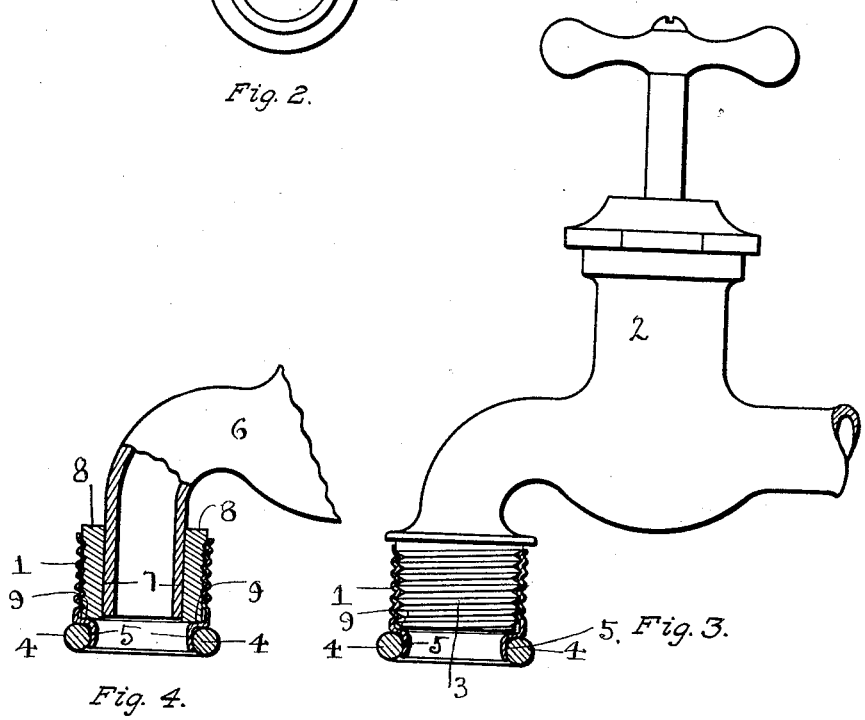
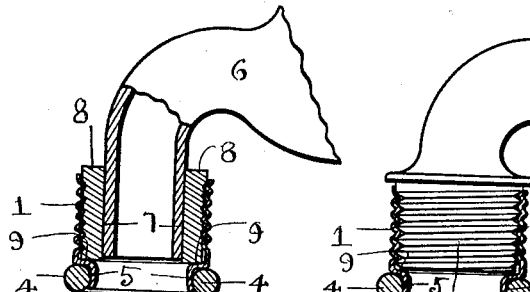
Fig. 4.
Witnesses
D. S. Cole
W. E. Hall
Inventor
Louis A. Cornelius
By Cyrus W. Rice,
Attorney

UNITED STATES PATENT OFFICE.

LOUIS A. CORNELIUS, OF GRAND RAPIDS, MICHIGAN.

FAUCET-GUARD.

1,105,258.  Specification of Letters Patent.  Patented July 28, 1914.

Application filed May 12, 1913. Serial No. 767,183.

*To all whom it may concern:*

Be it known that I, LOUIS A. CORNELIUS, a citizen of the United States, residing at Grand Rapids, in the county of Kent and State of Michigan, have invented new and useful Improvements in Faucet-Guards, of which the following is a specification.

My present invention relates to faucet guards, and its object is to provide a device of that character which will prevent the breaking of fragile vessels used in connection with the faucet to which my guard is attached; and further, to provide such a guard which may be readily applied to the faucet; and further, to provide such a device improved in other respects hereinafter appearing.

These objects are attained by, and the invention finds a preferable embodiment in, the structure hereinafter described, and illustrated in the accompanying drawings, in which:—

Figure 1 is a side view of my faucet guard: Fig. 2 is a bottom plan view of the same; Fig. 3 is a view of the same in central vertical section and shown applied to a faucet having a threaded nozzle; and Fig. 4 is a like view of the same shown applied to a faucet having a plain nozzle.

The integral tube 1, threaded as shown that it may be screwed on the threaded nozzle 3 of a faucet 2, carries at its lower end an annular buffer 4 of suitable material, preferably rubber. This buffer is held in an annular groove 5 formed on the outer surface of the tube 1 and of sufficient depth to securely hold it, although the lowest extremity of the tube preferably does not extend as low as the lowest portion of the buffer,—and this in order to more surely prevent any vessel used in connection with the faucet from striking the tube. The rubber buffer is stretched or distended sufficiently to pass over the lower end of the tube, and thereupon contracts and is held in the groove's bottom.

The device may be adapted for attachment to faucets 6 having plain nozzles 7, as by inserting into the tube 1 a suitable packing 8, preferably of rubber, as shown in Fig. 4, which packing is held on the tube's shoulder 9, and is compressed between the tube's inner wall and the faucet when the device is forced into its place shown in said Fig. 4.

Not confining myself to details of construction shown or described, I claim:—

In a device of the character described, a tube adapted to be secured to a faucet's nozzle and having on its internal wall a shoulder and a packing member carried on the shoulder, and having on its exterior wall an annular groove and an annular buffer held in the groove, the portion of the tube which forms the shoulder on the inside forming also a portion of the groove on the outside.

In testimony whereof I have hereunto set my hand in presence of two subscribing witnesses.

LOUIS A. CORNELIUS.

Witnesses:
C. EVAN JOHNSON,
W. S. PROUDFIT.

Copies of this patent may be obtained for five cents each, by addressing the "Commissioner of Patents, Washington, D. C."